(12) United States Patent
Satou et al.

(10) Patent No.: US 9,478,775 B2
(45) Date of Patent: Oct. 25, 2016

(54) BATTERY PACK

(71) Applicant: NISSAN MOTOR CO., LTD., Yokohama-shi, Kanagawa (JP)

(72) Inventors: Keisuke Satou, Ebina (JP); Ryuichi Amagai, Isehara (JP); Kentaro Hatta, Kawasaki (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/424,644

(22) PCT Filed: Aug. 9, 2013

(86) PCT No.: PCT/JP2013/071619
§ 371 (c)(1),
(2) Date: Feb. 27, 2015

(87) PCT Pub. No.: WO2014/045757
PCT Pub. Date: Mar. 27, 2014

(65) Prior Publication Data
US 2015/0221907 A1 Aug. 6, 2015

(30) Foreign Application Priority Data

Sep. 19, 2012 (JP) ................................ 2012-205738

(51) Int. Cl.
| H01M 2/02 | (2006.01) |
| H01M 2/00 | (2006.01) |
| H01M 2/10 | (2006.01) |
| H01M 10/04 | (2006.01) |

(52) U.S. Cl.
CPC ......... *H01M 2/1022* (2013.01); *H01M 2/1077* (2013.01); *H01M 10/0413* (2013.01); *H01M 10/0481* (2013.01); *H01M 2/1061* (2013.01)

(58) Field of Classification Search
CPC .................... H01M 10/0413; H01M 10/0481; H01M 2/1061; H01M 2/02–2/1294
See application file for complete search history.

(56) References Cited

U.S. PATENT DOCUMENTS

| 2006/0246350 A1* | 11/2006 | Takayama ............. B60L 3/0046 429/178 |
| 2008/0248377 A1 | 10/2008 | Hashida |
| 2009/0042099 A1* | 2/2009 | Tatematsu ........... H01M 2/1083 429/210 |

FOREIGN PATENT DOCUMENTS

| JP | S6374514 U | 5/1988 |
| JP | S6393275 U | 6/1988 |
| JP | 2006313733 A | 11/2006 |
| JP | 2009272234 A | 11/2009 |
| JP | 2011023266 A | 2/2011 |

* cited by examiner

*Primary Examiner* — Cynthia K Walls
(74) *Attorney, Agent, or Firm* — Young Basile Hanlon & MacFarlane, P.C.

(57) ABSTRACT

A battery pack with improved assembly workability includes a plurality of battery modules stacked on each other, each provided with a case accommodating a unit cell and a through-bolt that penetrates a through hole formed in the cases along the stacking direction of the battery modules to connect the battery modules each other. The battery modules are further provided with an insertion auxiliary member that is inserted into at least one opening of the through hole, and the insertion auxiliary member has a tapered portion such that the inner diameter thereof gradually decreases towards the tip of the insertion auxiliary member.

5 Claims, 7 Drawing Sheets

BATTERY PACK

CROSS REFERENCE TO RELATED APPLICATION

The present application claims priority to Japanese Patent Application No. 2012-205738, filed Sep. 19, 2012, incorporated herein in its entirety.

TECHNICAL FIELD

The present invention relates to a battery pack comprising a plurality of battery modules.

BACKGROUND

An assembled battery pack is known, that combines a plurality of small battery packs by passing a through-bolt in a hole provided in the frame of a battery pack spacer for flat batteries. (for example, see Japanese Patent Application Publication No. JP 2009-272234 A). In Japanese Patent Application Publication No. JP 2009-272234 A, at the increase of the number of stacking or laminations, when the small battery packs are deviated even slightly, a problem arises that the through-bolt is difficult to be inserted into the hole and thus the assembly workability will be decreased.

SUMMARY

The object to be attained is to provide a battery pack with improved assembly workability.

The present invention solves the problem described above by inserting a tubular or cylindrical member having a first tapered portion with a progressively smaller inner diameter toward its tip into at least one end portion of a through-hole formed in a housing of an electric module along the stacking direction of the battery modules.

According to the present invention, when inserting a bolt into the through-hole of the battery module, since the insertion position of the bolt is corrected in the vicinity of the center of the through-hole by the first tapered portion, it is possible to improve the assembly workability of the battery pack.

DETAILED DESCRIPTION OF THE EMBODIMENTS

Below, a description is given of the present embodiment with reference to the drawings.

Figure 1:
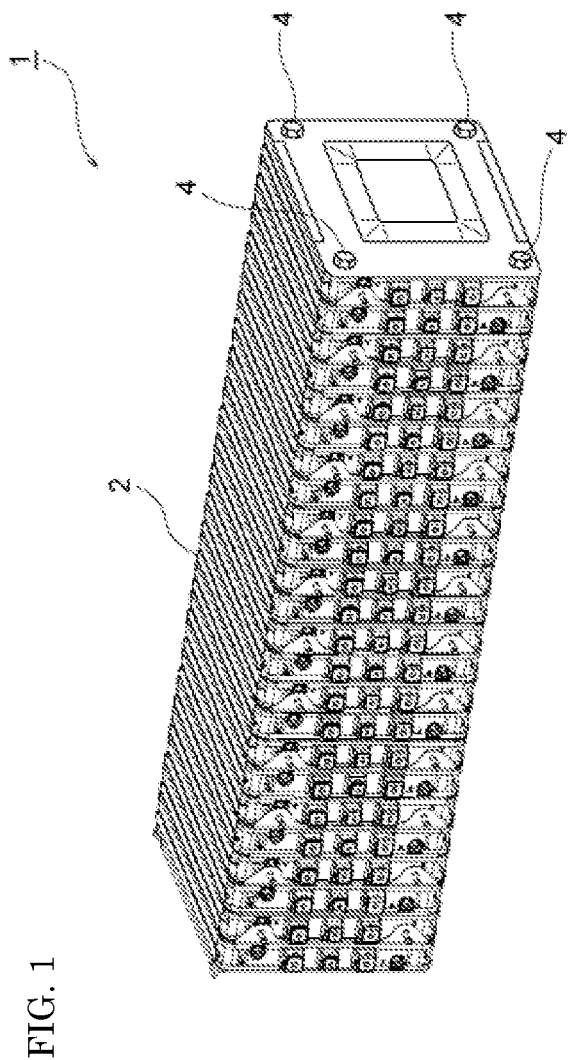
FIG. 1 is a perspective view of a battery pack in an embodiment according to the present invention.
Figure 2:
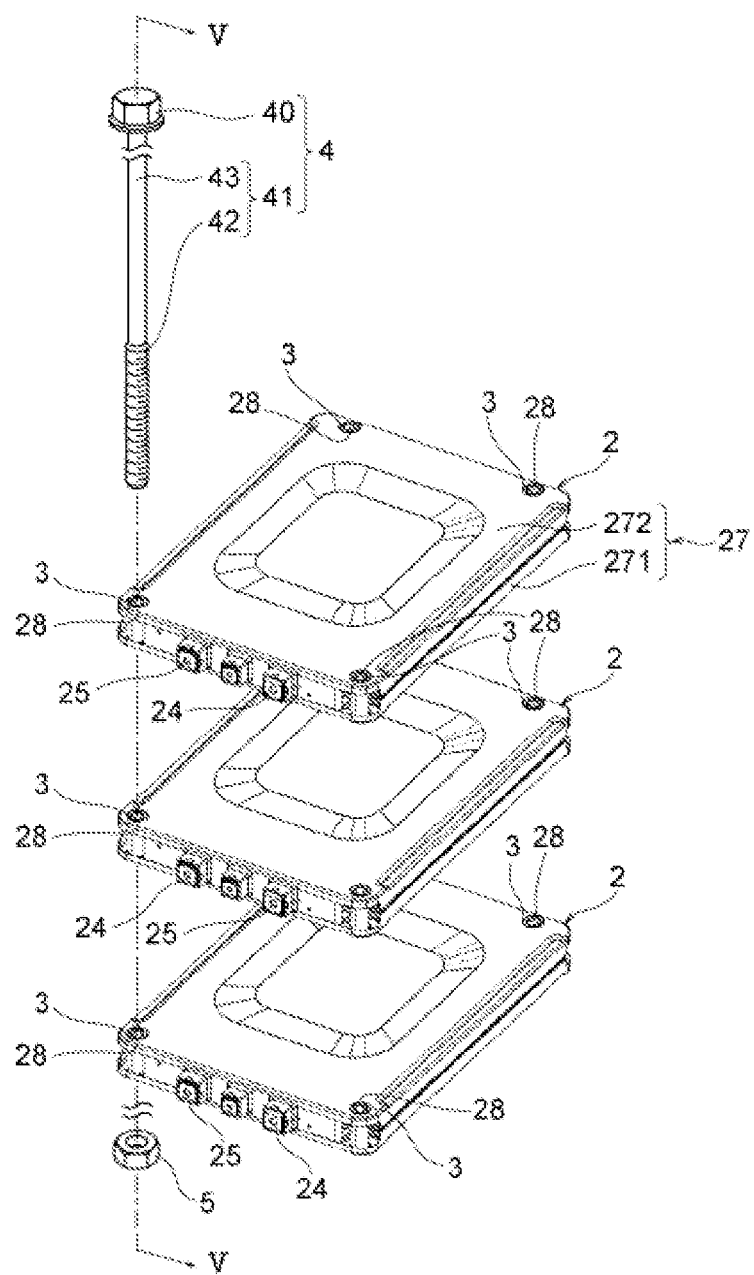
FIG. 2 is a partially exploded perspective view showing the battery pack in the embodiment according to the present invention.
Figure 3:
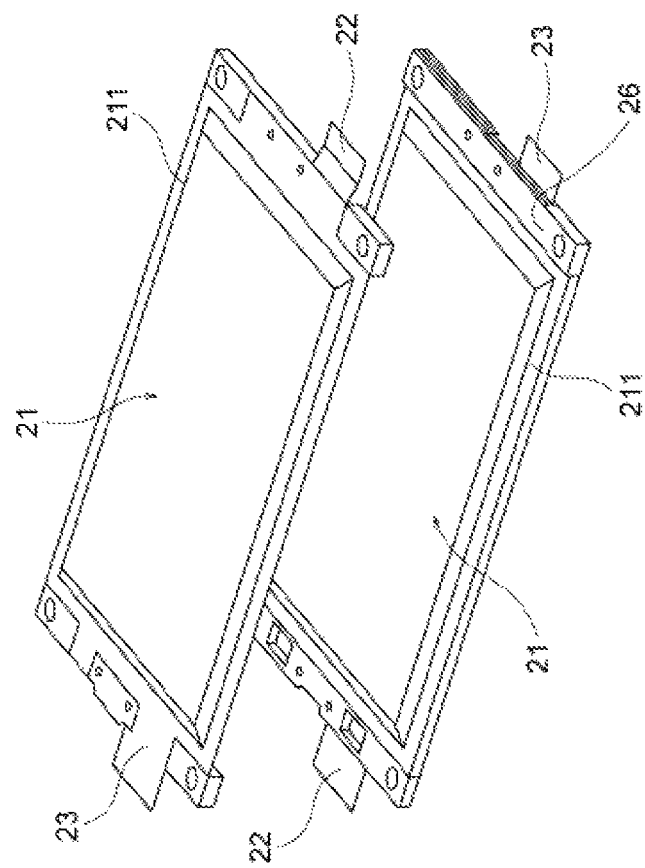
FIG. 3 is a perspective view of a unit cell that is built into a battery module in the embodiment according to the present invention.

FIG. 1 is a perspective view of a battery pack 1 in an embodiment according to the present invention. FIG. 2 is a partially exploded perspective view showing the battery pack 1 in the embodiment according to the present invention. FIG. 3 is a perspective view of a unit cell 21 that is built into a battery module 2 in the embodiment according to the present invention.

An assembled battery pack 1 in this embodiment, as shown in FIG. 1, includes a plurality of battery modules 2 stacked on one another and a through-bolt 4 for fixing by connecting the plurality of battery modules 2.

Each battery module 2, as shown in FIGS. 2 and 3, includes unit cells 21 stacked on to each other, a spacer 26 interposed between the unit cells 21, and a case for accommodating these unit cells 21 and spacers 26.

The unit cell 21 is, for example, a laminate battery such as a lithium-ion secondary battery, and as shown in FIG. 3, of flat shape and includes a lamination body (not shown) obtained by stacking or laminating a positive electrode plate and a negative electrode plate alternately with a spacer interposed and a laminate film 211 that seals the lamination body with an electrolyte solution. A positive electrode tab 22 connected to the positive electrode plate is derived outside and a negative electrode tab 23 connected to the negative electrode is derived from the opposite end of the lamination film 211. Note that the unit cell 21 may be composed of a nickel hydrogen battery, a lead battery and the like.

In the present embodiment, as shown in FIG. 3, after stacking the unit cells 21 by reversing the positive electrode tab 22 and the negative electrode tab alternately, by connecting the positive electrode tab and the negative electrode tab directly, respective unit cells 21 are connected in series. Further, a positive electrode side output terminal 24 is electrically connected to one end of a plurality of unit cells 21 electrically connected to each other, and a negative electrode side output terminal 25 is electrically connected to the other end. Note that the electrical connection of the unit cells is not particularly limited thereto.

Incidentally, in FIG. 3, only two adjacent unit cells 21 are shown. However, in the actual case, eight unit cells 21 are stacked and accommodated in the case 27. Note that the number of unit cells 21 stacked in the case 27 is not particularly limited. For example, a single unit cell 21 may be contained in the case 27.

The case 27, as shown in FIG. 2, is composed of a lower case 271 and an upper case 272 of box shape. These lower case 271 and upper case 272 are formed, for example, of an aluminum plate.

The cells 21, as shown in FIG. 3, is placed in the lower case 271 in a state in which a spacer 26 is interposed for securing insulation of the unit cells 21 adjacent to each other, and, by covering the upper case 272 to lower case 271, the cells 21 and the like are housed in the case 27.

In the present embodiment, as shown in FIG. 2, through-holes 28 are formed in the four corners of the case 27. The through-holes 28 are dimensioned in order for a shaft portion 41 of a through-bolt 4 described below may be inserted. Further, in each of the through-holes 28, an insertion auxiliary member 3 is attached in an opening 29 (see FIG. 6) on the side of both the lower case 271 and the upper case 272. Note that the number of thorough holes 28 formed in the case 27 is not particularly limited.

Figure 4:
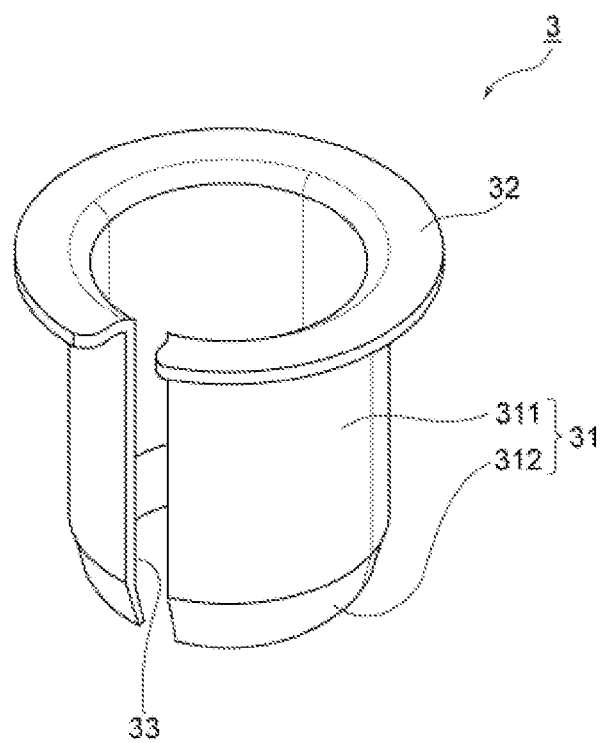
FIG. 4 is a perspective view of an insertion auxiliary member in the embodiment according to the present invention.
Figure 5:
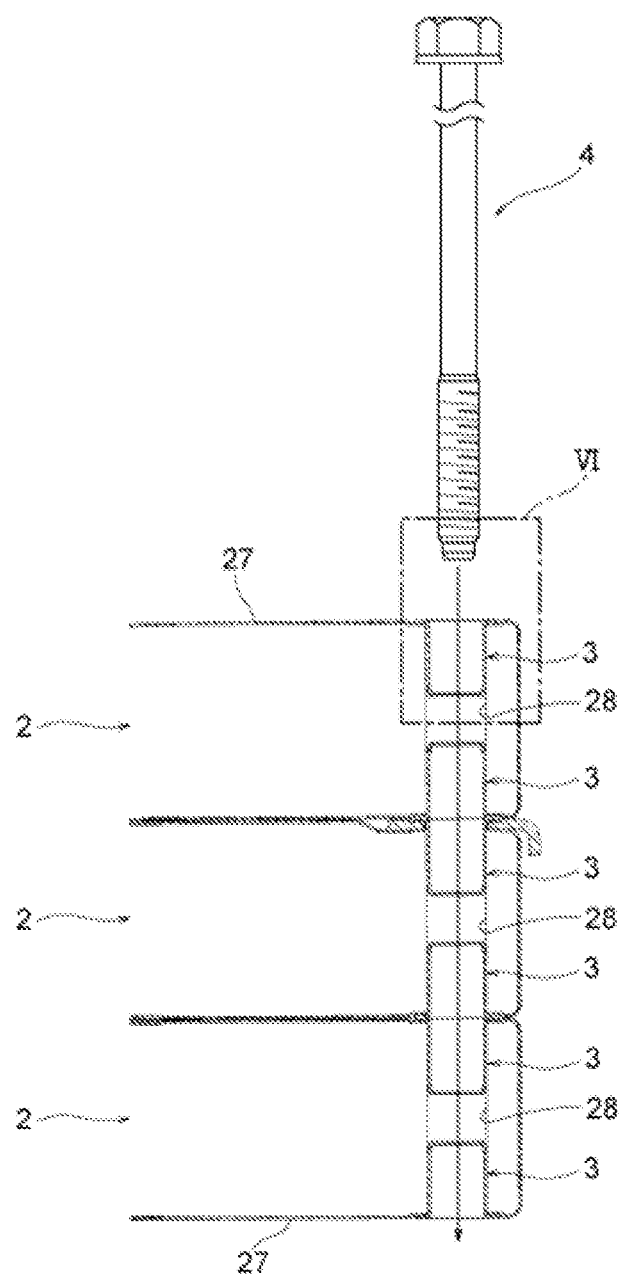
FIG. 5 is a sectional view taken along line V-V in FIG. 2.
Figure 6:
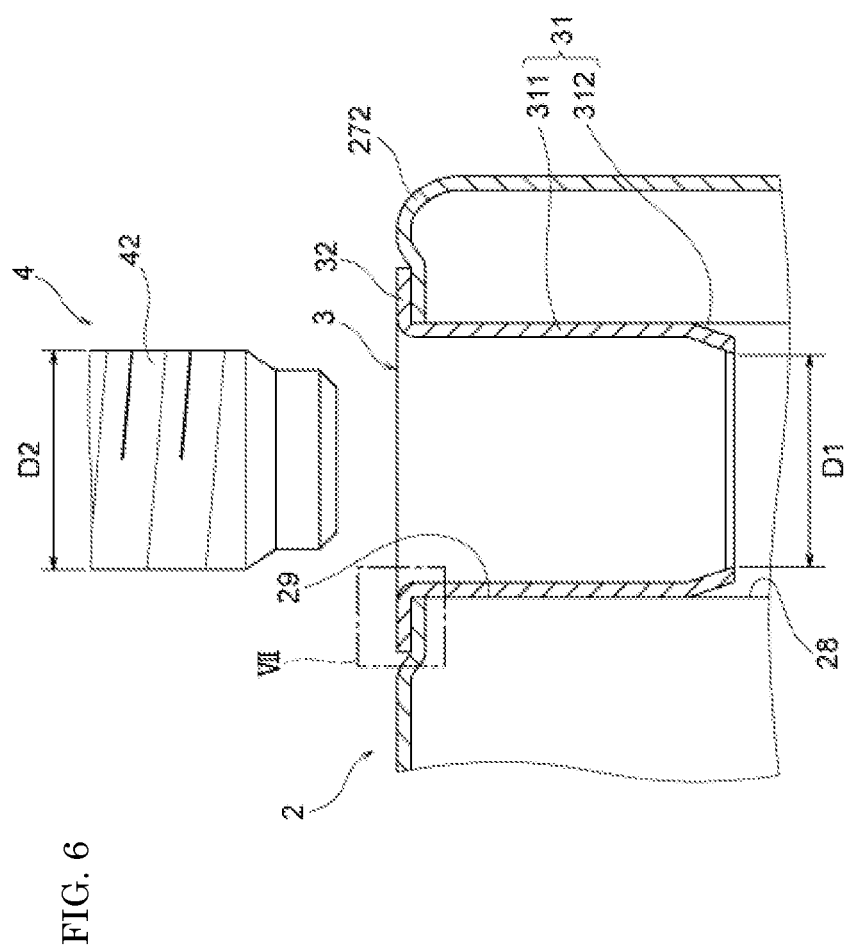
FIG. 6 is an enlarged view of the portion VI in FIG. 5.
Figure 7:
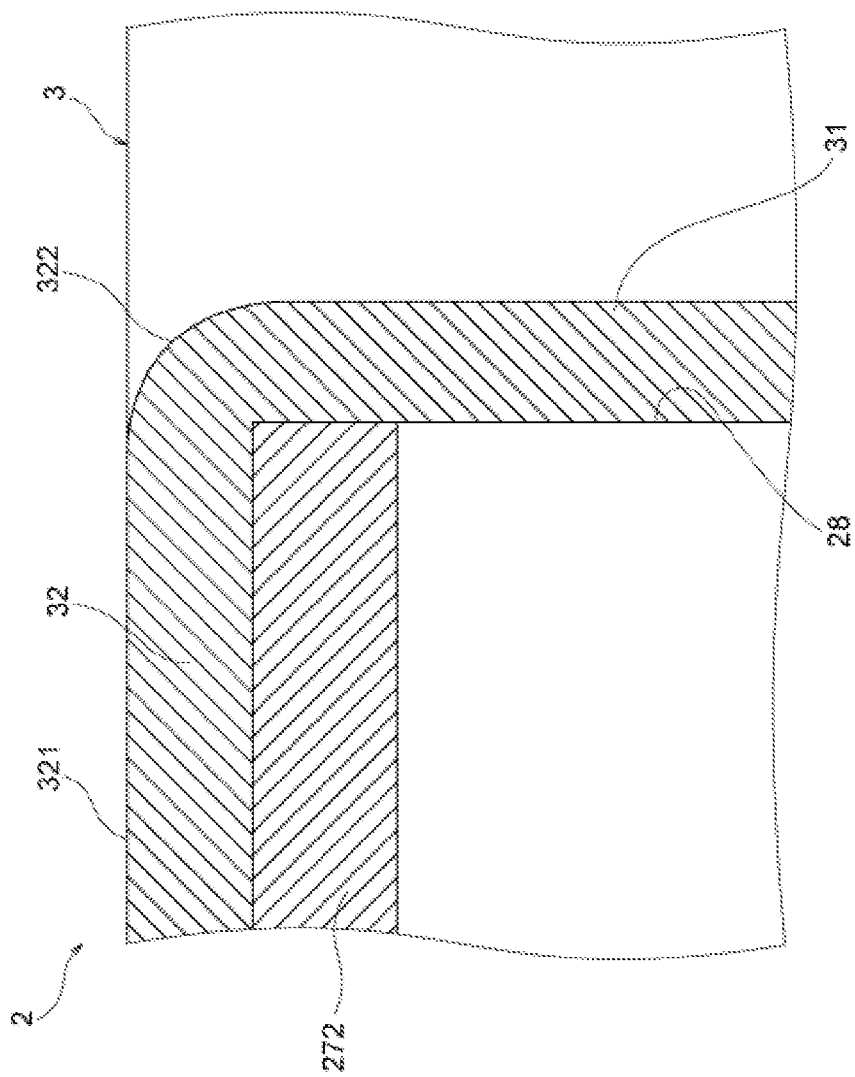
FIG. 7 is an enlarged view of the portion VII in FIG. 6.

FIG. 4 is a perspective view of the insertion auxiliary member 3 in the present embodiment. FIG. 5 is a sectional view taken along line V-V in FIG. 2. FIG. 6 is an enlarged view of the portion VI in FIG. 5; and FIG. 7 is an enlarged view of the portion VII in FIG. 6.

The insertion auxiliary member 3, as shown in FIG. 4, has an insertion portion 31 and an engaging portion 32, for example, is made of steel such as iron, stainless steel, etc., or formed from heat-resistant plastic resin.

The insertion portion 31 includes a cylindrical portion 311 and a tapered portion 312. The cylindrical portion 311 has a cylindrical shape of an outer diameter slightly greater than the diameter of the through-hole 28, prior to a state of attachment to the opening 29 of the through-hole 28 formed in the battery module 2. On the other hand, the tapered portion 312 has a gradually decreasing inner diameter toward the tip or distal end, and is connected to a lower end of the cylindrical portion 311 in FIG. 4.

The engaging or locking portion 32 is provided in the insertion portion 31 coaxially and is formed to extend radially outward from the upper end of the insertion portion 31 in FIG. 4 to resemble a flat doughnut.

The insertion auxiliary member 3 is attached to the opening 29 of the through-hole 28 by press-fitting into the through-hole 28 after inserting the tapered portion 312 of the insertion portion 31 into the opening 29. At this time, as shown in FIG. 6, the engaging portion 32 is engaged with the peripheral edge of the opening 29 of the through-hole 28 and the insertion auxiliary member 3 will be held in the opening 29.

A part of the side surface of the insertion auxiliary member 3 in the present embodiment, as shown in FIG. 3, is formed with a slit 33 substantially parallel to the axial direction of the insertion auxiliary member 3. Thus, the insertion auxiliary member is formed radially deformable. Note that the shape of the slit 33 is not limited to the one which is described above. Also, the way by which the insertion auxiliary member 3 slits 33 is made deformable is not particularly limited.

In the present embodiment, although the insertion portion 31 and the locking or engaging portion 32 are integrally formed by pressing a single steel material, the manufacturing method is not limited thereto. For example, after forming the insertion portion 31 and the engaging portion 32 separately, these are then joined to form the insertion auxiliary member 3.

In addition, although the insertion auxiliary member 3 in the present embodiment, as shown in FIG. 5, is attached to both the top and the bottom of the openings 29 of the through-hole 28, the arrangement is not particularly limited thereto. The insertion auxiliary member 3 may be attached to the one of the upper or lower openings 29 of the through-holes 28.

Also, the insertion auxiliary member 3 in the present embodiment, as shown in FIG. 7, has a tapered portion 322 on the inner side of the engaging portion 32, that increases in the inner diameter gradually toward the top surface 321 of the engaging portion 32.

The through-bolt 4 connecting the battery modules 2, as shown in FIG. 2, includes a head portion 40 and a shaft portion 41.

The shaft portion 41 is formed with a screw or threaded portion 42 to be screwed with the nut 5 and a cylindrical portion 43 with an appropriate dimensioned so as to be insertable into the cylindrical portion 311 of the insertion auxiliary member 3 fitted into the opening 29 of the through-hole 28. Further, the length of the shaft portion 41 is set slightly longer than the length of the plurality of battery modules 2 of the battery pack 1 in the stacking direction.

The through-bolt 4, as shown in FIG. 2, after being inserted through each of the four through-holes 28 formed in the case 27 of each battery module 2, by fastening with a nut 5, the plurality of battery modules 2 are connected and fixed to each other. In FIG. 2, only three battery modules 2 are shown, and the remaining stacked battery modules 2 are omitted. Also, in FIG. 2, only one of four through-bolts 4 is shown, which are respectively inserted into four through-holes 28 formed with the case 27 of the battery modules 2, and the remaining three through-bolts are omitted.

The threaded portion 42 of the through-bolt 4 in the present embodiment, as shown in FIG. 6, has a larger diameter of D2 than the minimum value D1 of the inner diameter provided at the tapered portion 312 of the insertion auxiliary member 3 attached to the opening 29 of the through-hole 28 (D2>D1). Alternatively, the threaded portion 42 may be formed smaller than the cylindrical portion 43 so that the cylindrical portion 43 has a diameter D2. Further, both the threaded portion 42 and the cylindrical portion 43 may have the diameter D2.

Now, a description is give of the operation of the present embodiment.

In the assembled battery pack 1 in the present embodiment, as shown in FIGS. 1 and 2, a through-bolt 4 is inserted through the through-holes 28 respectively provided to a plurality of cases 27 of the stacked battery modules 2. Thereafter, by fastening with a nut 5, the plurality of battery modules are connected and fixed together.

When assembling the battery pack 1, as shown in FIG. 2, an approximate positioning of the plurality of battery modules 2 is performed so that the through-holes 28 will be aligned with each other with each battery module 2 overlapping, then the through-bolt 4 is sequentially inserted in the through-hole 28 of each of the battery modules 2.

In the present embodiment, as shown in FIG. 6, the insertion auxiliary member 3 is attached to the opening 29 of the through-hole 28, and in the periphery of the lower end of the insertion portion 31 of the insertion auxiliary member 3, a tapered portion 312 is provided which decreases it inner diameter gradually toward its tip. Thus, at the time of insertion of the through-bolt 4, when the through-bolt 4 is pushed into the through-hole 28, the through-bolt 4 pressurized the insertion auxiliary member 3 in the radial direction via the inclination of the tapered portion 312 so that the position of the battery module 2 will be modified to be located near the center of the through-hole 28.

Thus, at the time of insertion of the through-bolt 4, even though a slight misalignment among the plurality of battery modules is caused, the through-bolt 4 may be inserted with ease into the through-holes 28 of the plurality of battery modules 2. Therefore, it is possible to improve the assembly workability of the battery pack 1.

In the present embodiment, as shown in FIG. 5, the insertion auxiliary member 3 is attached to both the upper side and lower side openings 29. Therefore, irrespective in which direction, i.e., from the upper side or lower side, the though bolt 4 is inserted, it is possible to improve the assembly workability of the assembled battery 1.

Furthermore, on the side of the insertion auxiliary member 3 in the present embodiment, as shown in FIG. 4, a slit 33 is formed such that the insertion auxiliary member 3 is resiliently deformable in the radial direction. Therefore, when the insertion auxiliary member 3 is attached by press-fitting in the opening 29 of the through-hole 28, the insertion auxiliary member 3 can be stably maintained in the opening 29.

Moreover, due to the insertion auxiliary member 3 being elastically deformable in the radial direction by the slit 33, when the thorough bolt 4 is inserted along the shape of the tapered portion 312, it is possible to reduce a play between the through-bolt 4 and the tapered portion 312. Therefore, it is possible that the alignment accuracy of the battery modules 2 at the time of insertion of the through-bolts 4 is improved, and further, the assembly work of battery pack 1 will be improved.

Also, the threaded portion 42 of the through-bolt 4 in the present embodiment, as shown in FIG. 6, is configured to have a diameter D2 larger than the minimum value D1 of the inner diameter of the tapered portion 312 of the insertion auxiliary member 3 attached to the opening 29 of the through-hole 28 (D2>D1). With the play further reduced between the through-bolt 4 and the tapered portion 312 when the through-bolt is inserted along the shape of the tapered portion 312, the position alignment accuracy of the battery modules 2 at the time of insertion of the through-bolt 4 will be further improved so that it is possible to further improve the assembly workability of the assembled battery pack 1.

Also, the insertion auxiliary member 3 in the present embodiment, as shown in FIG. 7, is provided with a tapered portion 322 on the inner side of the engaging portion 32, whose inner diameter gradually increases toward the top or upper surface 321 of the engaging portion 32. Therefore, even when the through-bolt 4 is about to be inserted slightly deviated from the opening 29 of the through-hole 28, since the through-bolt 4 may be inserted into the through-hole 28 along the shape of the tapered portion 322 the workability in the insertion work of the through-bolt 4 can be improved.

Furthermore, even when the positional deviation between the battery modules 2 has occurred at the time of insertion of the through-bolt 4, the through-bolt 4, when being pressed into the through-hole 28, pressurizes the insertion auxiliary member 3 radially via the inclination of the tapered portion 322. Thus, the position of the battery modules 2 will be corrected so that the through-bolt 4 will be positioned near the center of the through-hole 28. Thus, the position deviation tolerance of the battery modules 2 allowed at the time of insertion of the though bolt 4 is expanded so as for the through-bolt 4 to be more easily inserted. Therefore, the assembly workability of the battery pack 1 will be even more improved.

The case 27 in the present embodiment corresponds to an example of a housing according to the present invention. The insertion auxiliary member 3 in the present embodiment corresponds to an example of a tubular member in the present invention. The lower end of the insertion portion 31 of the insertion auxiliary member 3 in this embodiment corresponds to an example of a tip of the tubular member in the present invention. The tapered portion 312 in this embodiment corresponds to an example of a first tapered portion in the present invention. The diameter D2 of the threaded portion 42 of the through-bolt 4 in this embodiment corresponds to an example of the maximum outer diameter of the shaft portion of the bolt in the present invention. The minimum internal diameter value D1 of the inner diameter of the tapered portion 312 in this embodiment corresponds to the minimum internal diameter of the first tapered portion of the present invention The top surface 321 of the engaging portion 32 of the insertion auxiliary member 3 in the present embodiment corresponds to an example of the rear end of the tubular member. Finally, the tapered portion 322 in the present embodiment corresponds to an example of a second tapered portion in the present invention.

The embodiments described above is a one that is described in order to facilitate understanding of the invention and are not to those described to limit the present invention. Therefore, the elements disclosed in the above embodiments are intended to include all design modifications and equivalents belonging to the technical scope of the present invention.

The invention claimed is:

1. A battery pack, comprising:
   a plurality of battery modules stacked to each other, each being provided with a housing accommodating a unit cell;
   a bolt that is inserted into a through-hole formed in the housing of each battery module along a stacking direction of the battery modules to connect the battery modules to each other, wherein each battery module has a tubular member that is inserted in at least one end of the through-hole, and the tubular member has a first tapered portion whose inner diameter decreases gradually toward a tip of the tubular member and a cylindrical portion formed on a rear end side of the first tapered portion and having a substantially constant inner diameter, and
   wherein the tubular member is constructed such that the inner diameter of the rear end side of the first tapered portion is configured to be equal to or larger than a maximum inner diameter of the first tapered portion.

2. The battery pack according to claim 1, wherein the tubular member is inserted into both openings of the through-hole separately from each other.

3. The battery pack according to claim 1, wherein the tubular member is elastically deformable at least in the radial direction of the tubular member.

4. The battery pack according to claim 1, wherein the maximum outer diameter of the shaft portion of the bolt is configured to be greater than the minimum value of the inner diameter of the first tapered portion.

5. The battery pack according to claim 1, wherein the tubular member has a second tapered portion whose inner diameter gradually increases toward the rear end of the tubular member.

* * * * *